(12) United States Patent
Atkinson (10) Patent No.: US 9,261,712 B2
(45) Date of Patent: Feb. 16, 2016

(54) CONTACT LENSES, APPARATUS AND METHODS

(71) Applicant: CooperVision International Holding Company, LP, St. Michael (BB)

(72) Inventor: Hayden Atkinson, Basingstoke (GB)

(73) Assignee: COOPERVISION INTERNATIONAL HOLDING COMPANY, LP, St. Michael (BB)

( * ) Notice: Subject to any disclaimer, the term of this patent is extended or adjusted under 35 U.S.C. 154(b) by 18 days.

(21) Appl. No.: 14/127,616

(22) PCT Filed: Nov. 6, 2012

(86) PCT No.: PCT/GB2012/052763
§ 371 (c)(1),
(2) Date: Dec. 19, 2013

(87) PCT Pub. No.: WO2013/068736
PCT Pub. Date: May 16, 2013

(65) Prior Publication Data
US 2014/0160425 A1   Jun. 12, 2014

Related U.S. Application Data

(60) Provisional application No. 61/556,614, filed on Nov. 7, 2011.

(51) Int. Cl.
| | | |
|---|---|---|
| *G02C 7/04* | (2006.01) |
| *B29D 11/00* | (2006.01) |
| *G02C 7/02* | (2006.01) |
| *B29C 39/24* | (2006.01) |
| *G02B 1/04* | (2006.01) |
| *B29C 39/00* | (2006.01) |
| *B29C 39/26* | (2006.01) |
| *B29L 11/00* | (2006.01) |

(52) U.S. Cl.
CPC ............... *G02C 7/04* (2013.01); *B29C 39/006* (2013.01); *B29C 39/24* (2013.01); *B29C 39/26* (2013.01); *B29D 11/00038* (2013.01); *B29D 11/00048* (2013.01); *B29D 11/00125* (2013.01); *G02B 1/043* (2013.01); *G02C 7/024* (2013.01); *G02C 7/046* (2013.01); *B29L 2011/0041* (2013.01)

(58) Field of Classification Search
CPC ........ G02C 7/041; G02C 7/046; G02C 7/024; G02C 7/04; B29D 11/00048; B29D 11/00413; B29D 11/0048; B29D 11/00528; B29D 11/00125; B29D 11/00038; B29D 11/00173; B29D 11/00326; B29D 11/00538; B29D 11/00336; B29C 39/26; B29C 39/006; B29C 39/24; G02B 1/043; B29L 2011/0041
See application file for complete search history.

(56) References Cited

U.S. PATENT DOCUMENTS

| | | |
|---|---|---|
| 5,747,102 A | 5/1998 | Smith et al. |
| 7,731,873 B2 | 6/2010 | Darnton et al. |
| 7,762,088 B2 | 7/2010 | Fiske et al. |
| 2002/0182316 A1* | 12/2002 | Gilliard et al. ............... 427/162 |
| 2007/0035051 A1* | 2/2007 | Darnton et al. ............. 264/1.32 |
| 2008/0062381 A1* | 3/2008 | Doshi et al. .................. 351/161 |
| 2008/0267828 A1 | 10/2008 | Wang et al. |
| 2011/0205266 A1* | 8/2011 | Chung et al. ..................... 347/6 |

* cited by examiner

*Primary Examiner* — Jordan Schwartz
(74) *Attorney, Agent, or Firm* — Stout, Uxa & Buyan, LLP; Frank J. Uxa (57) ABSTRACT

Method and apparatus for manufacturing a contact lens comprising: dispensing a plurality of separate portions (24) of a liquid composition onto a contact lens mold section (12, 16), each separate portion of the liquid composition having a volume of less than about 1000 nano-liters.

20 Claims, 2 Drawing Sheets

CONTACT LENSES, APPARATUS AND METHODS

The present invention relates to contact lenses, and to apparatus useful in producing contact lenses and methods of manufacturing contact lenses. More particularly, the invention relates to methods for dispensing liquid compositions onto contact lens mold sections; to apparatus comprising contact lens mold sections and liquid compositions; and to contact lenses, for example, manufactured/produced using such methods and/or apparatus.

BACKGROUND

Typically, in the cast molding of contact lenses, a single mold assembly for molding a single contact lens product includes a male mold section having a convex optical surface defining a posterior surface of the lens to be made, and a female mold section having a concave optical surface defining an anterior surface of a lens to be made. Thus, when the male and female mold sections are assembled together, a contact lens shaped cavity is formed between the concave surface of the female section and the convex surface of the male section.

A conventional apparatus for dispensing a lens precursor composition, for example, a polymerizable composition, is based on a syringe pump and commonly dispenses from about 30 microliters to about 80 microliters of polymerizable composition in a single mass onto the concave surface of the mold section. Due to variability in the volume of composition dispensed by such syringe pumps, the amount of composition dispensed onto the mold section typically exceeds the amount needed to produce the lens in order to avoid having less than the amount of composition necessary to form a lens present in the mold.

For example, such syringe pump systems have optimal rates of filling and emptying which are relatively slow, as operating at faster rates can cause air bubbles to form in the composition and/or can result in higher pressures to be present in the barrel, causing the composition to continue to flow out after the plunger has stopped moving. Additionally, it is common for a small amount of the dispensed composition to cling to the outside of the dispensing needle, resulting in the volume of the composition deposited into the mold being lower than intended. When another portion of the composition is subsequently dispensed through the needle, some of the composition already clinging to the outside of the needle may be dispensed along with the portion of the composition which is intended to be delivered, resulting in the volume of composition actually deposited into the mold being larger than intended. Furthermore, as the viscosity of the liquid typically is related to the temperature, the volume of composition delivered can vary over time due to changes in temperature, and can vary from syringe to syringe when a series of syringes are used, as is commonly done in a manufacturing setting. Due to these factors, as well as others, when using a syringe pump to dispense same size portions of composition into a plurality of contact lens molds, the actual volume of composition deposited into the molds can vary considerably, for example, by 5% or 10% or more, and it is difficult to predict and compensate for the variability.

Dispensing an excess volume of the composition into the mold results in the excess composition being "squeezed" out of the lens shaped cavity formed when the male mold section is combined with the female mold section. This excess composition may end up as a ring or partial ring of polymerized material outside the lens-shaped cavity is referred to as flash. The composition which ends up as flash is wasted since it cannot be reused to produce other lenses. Such waste of composition increases the cost of manufacturing cast molded lenses, particularly if the composition is relatively expensive, such as is typically true of compositions used to produce silicone hydrogels. The presence of flash can further increase manufacturing costs as additional process steps may be required to ensure that the flash is captured and removed during the manufacturing process.

Further, using the method of filling the female mold section in a single mass does not allow for pre-coating the mold, and can result in undesired mixing of the different compositions used and/or an uneven or non-uniform placement of a relatively thin layer of a coating or treatment composition over or on top of the surface of the basic lens composition, for example, polymerizable composition.

Thus, there is a need for new methods for manufacturing contact lenses, new apparatus useful in producing contact lenses and for new contact lenses manufactured/produced using such methods and/or apparatus.

SUMMARY OF THE INVENTION

New methods of manufacturing contact lenses; apparatus useful in producing contact lenses; and contact lenses have been discovered. The present contact lenses are products manufactured or produced using the present methods and/or apparatus.

The present methods and apparatus are effective in manufacturing or producing contact lenses at reduced cost, and/or reduced waste of contact lens precursor composition, such as polymerizable composition, and/or reduced production of unusable or off specification contact lenses, for example, relative to conventional methods and/or apparatus, for example, as noted above, which dispense between about 30 to about 80 microliters of material in a single mass onto the surface of a mold section, for example, onto the concave surface of a female mold section.

The present methods and apparatus are effective in placing controlled amounts of material, such as liquid compositions, for example, polymerizable compositions, on a lens mold section. The present methods and apparatus may provide that the total amount of material placed on the mold section closely approximates, or is substantially precisely, or is precisely, the amount of material desired to be placed on the mold section. Such controlled placement of material onto a lens mold section, in accordance with the present invention, produces contact lenses with one or more beneficial properties, for example, one or more properties which have values closer to the desired or specified values of such properties relative to lenses produced using conventional methods and/or apparatus, for example, as described elsewhere herein.

The present invention provides methods of manufacturing a contact lens. In one example, the method comprises dispensing a plurality of separate portions of a liquid composition onto a contact lens mold section, with each separate portion of the liquid composition having a volume of less than about 1000 nanoliters, that is less than about 1 microliter. In one example, the dispensing comprises using a pneumatically operated valve, such as a high speed pneumatically operated valve.

The present invention provides apparatus useful for producing a contact lens, which apparatus comprises a contact lens mold section; and a liquid composition located on the contact lens mold section, the liquid composition dispensed onto the contact lens mold section as a plurality of separate portions of the liquid composition, and each separate portion of the liquid composition having a volume of less than about 1000 nanoliters.

The apparatus may further comprise a pneumatically operated valve used in dispensing the liquid composition onto the contact lens mold section. The pneumatically operated valve may be a high-speed pneumatically operated valve.

The present invention provides a contact lens which comprises a cast molded polymeric lens body formed from a composition, such as a liquid composition, located in a mold assembly comprising a first mold section connected to a second mold section, wherein at least a portion of the composition is dispensed onto the first or second contact lens mold section as a plurality of separate portions of a liquid composition, each separate portion having a volume of less than about 1000 nanoliters.

Various examples of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any example of the present invention. Additional advantages and aspects of the present invention are apparent in the following detailed description, examples, and additional disclosure.

These and other aspects and advantages of the present invention will become apparent in the following detailed description, drawings, examples and claims, particularly when considered in conjunction with the accompanying drawings in which like parts bear like reference numerals.

DETAILED DESCRIPTION OF THE INVENTION

Definitions

In the context of the present description, drawings, and additional disclosure claims, the following terminology will be used in accordance with the definitions described below. Unless expressly stated to the contrary herein, a number of terms set forth herein have the same or substantially the same meaning or definition as the same or substantially the same term defined in U.S. patent application Ser. No. 12/894,941, filed Sep. 30, 2010, entitled "SILICONE HYDROGEL CONTACT LENSES AND METHODS OF MAKING SILICONE HYDROGEL CONTACT LENSES", the disclosure of which in its entirety is incorporated herein by reference.

As used herein, the terms "female (or first) mold or mold section" and "male (or second) mold or mold section" are abbreviated versions of and interchangeable with the terms "female (or first) contact lens mold section" and "male (or second) contact lens mold section", respectively.

A "monomer" refers to a single unit of a molecule containing one or more functional groups capable of polymerizing to combine with other molecules to form a polymer, the other molecules being of the same structure or different structures as the monomer.

A "polymer" refers to a material formed by polymerizing one or more monomers. As used herein, a polymer is understood to refer to a molecule that is not capable of being polymerized, but is capable of being crosslinked to other polymers, for example, to other polymers present in a polymerizable composition or during the reaction of monomers to form other polymers in a polymerizable composition.

As used herein, the term "hydrogel" refers to a polymeric material, typically a network or matrix of polymer chains, capable of swelling in water or becoming swollen with water. Hydrogels can comprise a hydrated, cross-linked polymeric system containing water in an equilibrium state. Accordingly, hydrogels are copolymers prepared from one or more reactive ingredients. The reactive ingredients are crosslinkable with a crosslinking agent, although the network or matrix formed by the reactive ingredients may or may not be crosslinked. Hydrogels refer to polymeric materials, including contact lenses that are water swellable or are water swelled, and which retains water in an equilibrium state. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component or a siloxane (SiO)-containing component. For example, a silicone hydrogel is typically prepared by combining a silicon or siloxane-containing material with conventional hydrophilic hydrogel precursors. A silicone hydrogel contact lens is a contact lens, including a vision correcting contact lens, which comprises a silicone hydrogel material.

The term "surfactant" or "surfactant component" refers to a substance which has the ability to reduce the surface tension of water, for example, water or an aqueous solution in which the substance is present. By reducing the surface tension of the water, the surfactant or surfactant component facilitates the water containing the surfactant or surfactant component, when in contact with a contact lens body which has not previously been subjected to extraction processing with an organic solvent, to more intimately contact the lens body and/or more effectively wash or remove at least one material present in the lens body from the lens body relative to the water without the surfactant or surfactant component. Examples of surfactants or surfactant components include, without limitation, zwitterionic surfactants including forms of betaine, non-ionic surfactants including forms of polysorbate such as polysorbate 80, forms of poloxamers or poloxamines, fluorinated surfactants, and the like and mixtures thereof.

The term "contact lens" as used herein refers to an ophthalmic lens which, is of a structure, size, shape and power that it can be worn on the cornea of an eye. The term "contact lens" can also be understood to refer to an article which may be treated, for example, hydrated and swelled into a hydrated lens of a size, shape and optical power or powers as to be wearable on an eye, for example, a human eye. The present invention may provide a hydrogel contact lens, for example, a silicone hydrogel contact lens.

The present invention is described herein with respect to methods of manufacturing contact lenses, to apparatus useful in producing contact lenses and to contact lenses. It is to be appreciated that, with appropriate modification thereto, the present methods and apparatus may be useful for the manufacture of other types of ophthalmic lenses and to other types of ophthalmic lenses.

The present invention provides methods of manufacturing a contact lens. In one example, the method comprises dispensing a plurality of separate portions of a liquid composition onto a contact lens mold section, with each separate portion of the liquid composition having a volume of less than about 1000 nanoliters, that is, less than about 1 microliter. In one example, the volume of each portion of the plurality of portions is in a range of about 10 nanoliters to about 2 milliliters, or in a range of about 10 nanoliters to about 200 nanoliters.

In one example, each separate portion of the liquid composition dispensed in accordance with the present invention is dispensed sequentially, that is, the portions of the liquid composition are dispensed one at a time or one by one. In one example, each separate portion of the liquid composition is dispensed over a period of time of about 2 milliseconds or less, for example, about 1 millisecond or less.

In a useful example, the dispensing comprises employing a pneumatically operated valve. In one example, the pneumatically operated valve is a high-speed pneumatically operated valve.

In one example, a method of manufacturing a contact lens comprises dispensing at least one portion, for example, a plurality of portions or separate portions, of a polymerizable composition onto a contact lens mold section, the dispensing comprising employing a dispensing system comprising a high-speed pneumatically operated valve having a switching time of about 2 milliseconds or less, for example, about 1 millisecond or less.

The pneumatically operated valve may be a component of a dispensing system, for example, a dispensing apparatus, a dispensing machine and the like. For example, and without limitation, one such dispensing system is the dispensing system sold by Liquidyn GmBH (Sauerlach, Germany) under the trade name MICRO-DISPENSING VALVE P-DOT. Another example, without limitation, of such a dispensing system is the dispensing system sold by Liquidyn GmBH under the tradename MICRO-DISPENSING VALVE P-JET.

The dispensing step may comprise dispensing the liquid composition from a dispensing system separate and apart from, for example, not in contact with, the contact lens mold section. In one example, the dispensing occurs so that no portion of the dispensing system is in contact with the contact lens mold section or the liquid composition or polymerizable composition on the contact lens mold section. At least a portion of the dispensing system may be located less than about 50 millimeters away from the contact lens mold section. In one example, at least a portion of the dispensing system is located at a distance in a range of about 2 millimeters to about 40 millimeters away from the contact lens mold section.

In one example, the liquid composition is dispensed onto a female contact lens mold section. A female contact lens mold section may be defined as a contact lens mold section having a concave surface, for example, a concave optical surface, useful in forming the anterior surface or face of a contact lens. The liquid composition may be dispensed onto a male contact lens mold section. A male contact lens mold section may be defined as a contact lens mold section having a convex surface, for example, a convex optical surface, useful in forming the posterior surface or face of a contact lens.

In one example, the liquid composition comprises a polymerizable composition, for example, a polymerizable lens composition. The polymerizable composition may comprise at least one monomer. As used herein, a monomer is understood to be a polymerizable molecule (i.e., a molecule having at least one polymerizable functional group), and to include macromers and pre-polymers. The polymerizable composition may comprise at least one hydrophilic monomer to be polymerized in forming a hydrogel contact lens. In one example, the polymerizable composition comprises at least one siloxane-containing component, e.g., at least one siloxane-containing monomer, to be polymerized in forming a silicone hydrogel contact lens.

In one example, the liquid composition is a non-polymerizable composition. The liquid composition, for example, a polymerizable liquid composition or a non-polymerizable liquid composition, may comprise at least one surfactant.

The dispensing may be effective to coat at least a portion of a surface of the contact lens mold section with the liquid composition. The dispensing may be effective to substantially fill the contact lens mold section with the liquid composition, for example, with a sufficient amount of the liquid composition so that a full lens body, such as a full cast molded polymeric contact lens body, can be produced from the amount of the liquid composition on the mold section.

In one example, the dispensing is effective to place the liquid composition adjacent, for example, on top of or substantially surrounding, another composition other than the contact lens mold section located on the contact lens mold section. In one example, the other composition may comprise a polymerizable composition, a non-polymerizable composition or a polymerized composition, or any combination thereof.

The dispensed liquid composition may be effective to provide at least one of (1) a benefit to the contact lens mold section onto which the liquid composition is dispensed and (2) a benefit to the cast molded polymeric lens body and/or contact lens produced using the contact lens mold section onto which the liquid composition is dispensed.

In one example, the plurality of separate portions of the liquid composition dispensed are of more uniform volume relative to an equal number of separate portions of an identical liquid composition dispensed using a syringe pump and an injection needle, for example, without a pneumatically operated valve.

Each separate portion of the liquid composition dispensed may have a volume which differs by less than about 5%, or less than about 3%, or less than about 1%, from the average volume of the plurality of separate portions of the liquid composition dispensed in accordance with the present invention.

In one example, the liquid composition has a viscosity of at least about 0.5 mPa·s at about 25° C., for example, about 0.5 to about 200,000 mPa·s at 25° C., or about 50 to about 10,000 mPa·s at 25° C.

In one example, the contact lens mold section onto which the liquid composition, for example, a polymerizable composition such as a polymerizable lens composition, is dispensed comprises a first contact lens mold section, and the present method further comprises a step of placing a second contact lens mold section in contact with the first contact lens mold section. The method may further comprise a step of connecting the first contact lens mold section to the second contact lens mold section or a step of connecting the first mold section and the second mold section together.

In one example, the connecting comprises engaging an interference fitting between the first contact lens mold section and the second contact lens mold section, or forming one weld or a plurality of welds between the first contact lens mold section and the second contact lens mold section, such as, for example, using one or more heat stakes. The connected or welded first and second mold sections may be considered to be a contact lens mold or contact lens mold assembly.

In one example, the method further comprises a step of exposing the contact lens mold section or the contact lens mold to conditions, for example, a level of thermal radiation, actinic radiation, or both, effective to polymerize the polymerizable composition, such as a polymerizable lens composition, to form a polymeric lens body, such as a cast molded polymeric lens body, in the contact lens mold section or mold.

In one example, the present method forms a polymeric lens body, such as a cast molded polymeric contact lens body, substantially without forming a flash ring.

In one example, the method further comprises the step of verifying that the at least one portion or each portion of the plurality of portions of the liquid composition, for example and without limitation, the polymerizable composition, is dispensed. The step of verifying may comprise using one or more assemblies to monitor and/or control the functioning of the dispensing system, for example and without limitation, pneumatically operated valve, such as the high-speed pneumatically operated valve. For example, the step of verifying may comprise using a closed loop sensor assembly. As used herein, a closed loop sensor assembly in general refers to an assembly in which operational information from a functioning dispensing system is sensed or monitored, for example, substantially continuously monitored; and this operational information is provided to a control sub-assembly which uses this operational information to control the operation of the dispensing operation, for example, by changing one or more operating perimeters of the dispensing system, so that the operation of the dispensing system provides the desired result. In one example, the operation of the dispensing operation is substantially continuously controlled, for example, by the control sub-assembly.

In one example, the method further comprises maintaining the pneumatically operated valve, e.g., the high-speed pneumatically operated valve, at a temperature, such as a substantially constant temperature, for example, a temperature above ambient temperature, so that the composition, for example, the liquid composition or polymerizable composition, being dispensed has a substantially constant viscosity. For example, the method may further comprise heating the pneumatically operated valve to a temperature above ambient temperature and, for example, substantially maintaining the valve at the above-ambient temperature during the dispensing. Such heating and/or maintaining may be effective in reducing dispensing variability due to changes in ambient temperature.

In one example, heating the pneumatically operated valve, e.g., the high-speed pneumatically operated valve, to a temperature above ambient and/or maintaining such valve at a substantially constant temperature above ambient can be used together with a closed loop sensor assembly to detect or confirm portions of the liquid composition being ejected from the dispense system and/or to verify that the dispensing of the portions of the liquid composition has been carried out.

In one example, the closed loop sensor assembly may include a sensor device, for example, a tachometer, or other device, positioned to sense and/or monitor the switching time of the pneumatically operated valve. For example, the reciprocating speed of a shaft or extension of the pneumatically operated valve may be related to the switching time of the valve. Thus, such speed sensed or monitored by the sensor device may be employed to determine the switching time of the valve, that is the time it takes the valve to move or switch between an open position and a closed position. The sensor device may be coupled to a control device which, in turn, may be connected to a valve driver or other device which can increase or decrease the switching time of the valve, to control the switching time of the valve.

Based on a signal from the sensor device, the control device can alter, e.g., increase or decrease, the switching time of the valve to achieve the desired dispensing of the composition.

The signal from the sensor device may be used to verify that portions of the composition, for example, of the desired size, are being dispensed, for example, at the desired frequency rate. The signal from the sensor device may be used to detect and/or verify dispensing. In one example, a closed-loop sensor may be used to detect the dispensed portions and verify that the desired number of portions have been dispensed into a mold section.

If parameters in the dispensing system, such as the chemical make-up, temperature, pressure and viscosity of the liquid composition, are maintained substantially constant, for example, as noted above, by maintaining the valve at a substantially constant temperature above ambient, it may be possible to determine, or at least closely estimate, the size (volume) of each portion of the liquid composition dispensed. In addition, by changing one or more of these parameters and/or the switching time of the pneumatically operated valve, the portion size may be changed or controlled, as desired.

The present invention provides apparatus useful for producing a contact lens, which apparatus comprises a contact lens mold section; and a liquid composition located on the contact lens mold section, the liquid composition dispensed onto the contact lens mold section as a plurality of separate portions of the liquid composition, and each separate portion of the liquid composition having a volume in a range of about 10 nanoliters to about 2 milliliters. In one example, the volume of each separate portion of the liquid composition has a volume of less than about 1000 nanoliters. In one example, the volume of each separate portion of the liquid composition has a volume in a range of about 10 nanoliters to about 200 nanoliters.

The apparatus may further comprise a pneumatically operated valve used in dispensing the liquid composition onto the contact lens mold section. The pneumatically operated valve may be a high-speed pneumatically operated valve.

The contact lens mold section onto which the liquid composition is dispensed may be as described elsewhere herein and may be a female contact lens mold section or may be a male mold section.

The liquid composition may comprise a polymerizable composition, or may comprise a non-polymerizable composition. In one example, the polymerizable composition may comprise a composition which, following polymerization, is capable of forming a silicone hydrogel material.

The plurality of separate portions of the liquid compositions may coat at least a portion of a surface of the contact lens mold section with the liquid composition.

The plurality of separate portions of the liquid composition may substantially fill the contact lens mold section with the liquid composition, for example, as described elsewhere herein.

In one example, the plurality of separate portions of the liquid composition are located on, for example, on top of or on the surface of or within, another composition, different from the liquid composition, other than the contact lens mold section present on the contact lens mold section. In one example, the other composition may comprise a polymerizable composition, or a non-polymerizable composition or a polymerized composition or any combination thereof.

The liquid composition may provide at least one of (1) a benefit to the contact lens mold section on which the liquid composition is located and (2) a benefit to the cast molded polymeric lens body and/or contact lens produced using the contact lens mold section on which the liquid composition is located.

In one example, each separate portion of the liquid composition dispensed has a volume which differs by less than about 5%, or less than about 3%, or less than 1% from the average volume of the plurality of separate portions of the liquid composition dispensed.

The present invention provides a contact lens which comprises a cast molded polymeric lens body formed from a composition, such as a liquid composition, for example, a composition comprising a polymerizable composition or a non-polymerizable composition, located in a mold assembly comprising a first or female contact lens mold section connected to a second or male contact lens mold section, wherein at least a portion of the composition is dispensed onto the first contact lens mold section or the second contact lens mold section as a plurality of separate portions of a liquid composition, each separate portion of the liquid composition having a volume of less than about 1000 nanoliters. The composition may be located between the connected first and second mold sections, for example, in a cavity, such as a lens-shaped cavity, formed between the connected first and second mold sections.

The composition, for example, a liquid composition, may comprise a polymerizable composition comprising at least one monomer to be polymerized in forming the polymeric lens body. In one example, the polymerizable composition comprises at least one siloxane-containing component, for example, a siloxane-containing monomer. The composition may be dispensed onto the first contact lens mold section or the second contact lens mold section using the methods and apparatus disclosed elsewhere herein.

The composition may be effective to provide at least one of (1) a benefit to the mold assembly and (2) a benefit to the cast molded polymeric lens body.

The cast molded polymeric lens body may be formed substantially without forming a flash ring. In other words, the polymerizable composition may be placed on the first lens mold section and/or on the second lens mold section in an amount so that the lens body, for example, the cast mold polymeric lens body, is formed without forming a flash ring of polymerizable lens composition or polymerized polymerizable lens composition outside the lens shaped cavity located between the connected first and second mold sections.

In one example, the cast molded polymeric lens body includes a cosmetic pattern derived from a liquid composition dispensed onto the mold section in accordance with the present invention. For example, the cosmetic pattern may be an iris-simulating pattern, one or more other aesthetically pleasing patterns or images and the like and combinations thereof.

The cast molded polymeric lens body may include a surface treatment located on a surface of the cast molded polymeric lens body, with the surface treatment being derived from a liquid composition dispensed onto the mold section in accordance with the present invention. The surface treatment may be effective to provide a benefit to the surface of the cast molded polymeric lens body. For example, the benefit may be selected from the group consisting of providing one or more drug components to the surface, providing one more antimicrobial components to the surface, providing increased wettability to the surface and the like benefits and combinations thereof. In one example, the one or more drug components provided to the surface comprise an anti-allergy drug, an anti-inflammatory drug or both.

Figure 1:
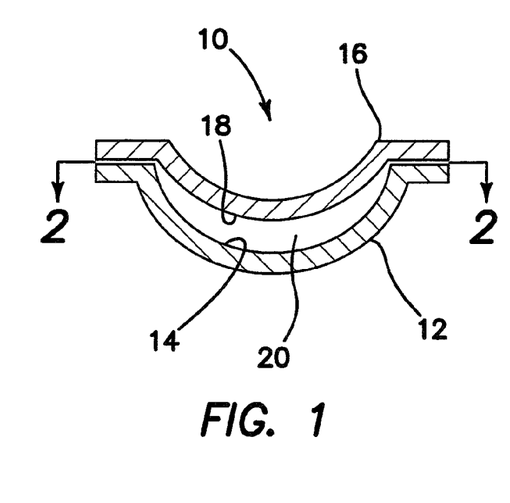
FIG. 1 is simplified cross-sectional view of a mold assembly useful for forming a contact lens.

With reference to FIG. 1, a contact lens may be produced using mold assembly 10, which comprises a first or female mold section 12 having a first, concave lens defining surface 14, and a second or male mold section 16 having a second, convex lens defining surface 18. As shown in FIG. 1, the female and male mold sections 12 and 16 define a lens shaped cavity 20 between the concave lens defining surface 14 and the convex lens defining surface 18 when the female mold section and the male mold section are connected together.

Figure 1A:
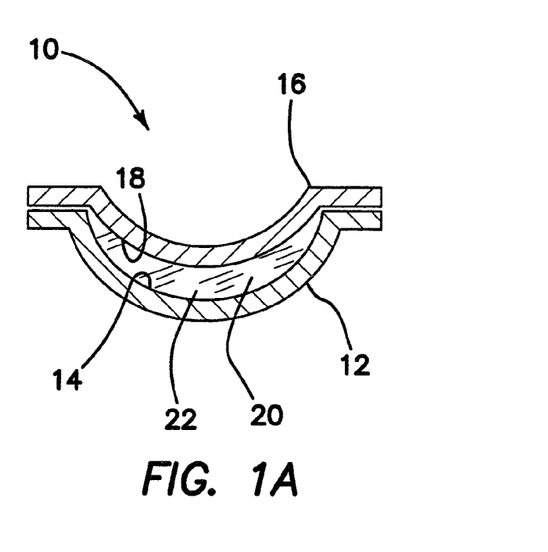
FIG. 1A is a cross-sectional view of the mold assembly of FIG. 1 having a polymerizable lens composition disposed between the two mold sections.

Turning now to FIG. 1A, a polymerizable silicone hydrogel contact lens composition 22 is shown in the lens shaped cavity 20. The polymerizable lens composition 22 can be a composition comprising one or more hydrophilic monomers and one or more siloxane-containing components, for example, one or more siloxane-containing monomers, and is suitable for producing a silicone hydrogel contact lens.

The polymerizable lens composition 22 is placed on the lens-shaped cavity 20 in accordance with the present invention.

Figure 2:
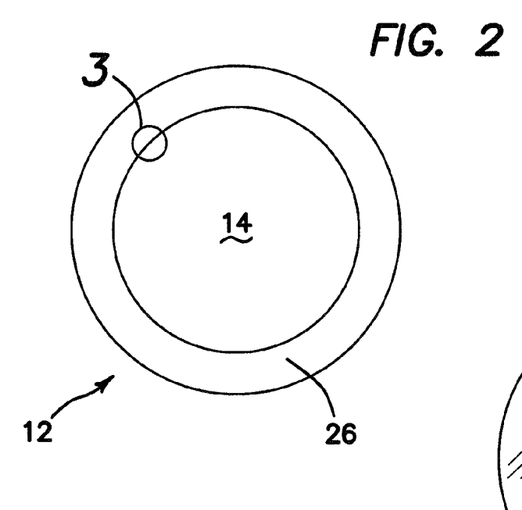
FIG. 2 is a plan view of the female mold section of the mold assembly of FIG. 1, taken along line 2-2 of FIG. 1.
Figure 3:
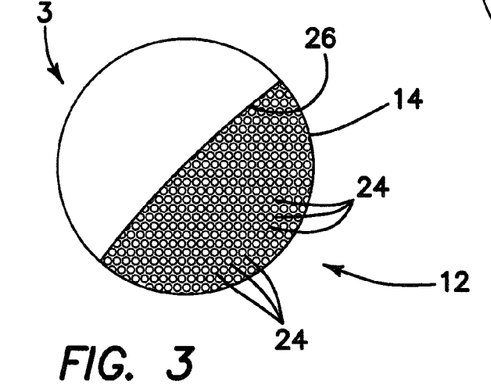
FIG. 3 is a close-up plan view of the encircled region 3 of the female mold section in FIG. 2 showing separate portions of a polymerizable lens composition dispensed on the female mold section in accordance with the present invention.

Thus, FIGS. 2 and 3 illustrate certain aspects of the dispensing of a first composition such as, for example, a polymerizable lens composition onto the lens defining surface 14 of the female mold section 12. During the dispensing operation the male mold section 16 is not connected to the female mold section 12 and may, in fact, be positioned so as to have no impact on the dispensing operation. The first composition is dispensed onto the lens defining surface 14 of first or female contact lens mold section 12 as a plurality of separate, small portions 24 of the first composition, as shown in FIG. 3. Each separate portion 24 of the first composition may have a volume of less than about 1000 nanoliters, that is less than about 1 microliter, for example, equal to or less than about 300 nanoliters, that is equal to or less than about 0.3 microliters.

Dispensing separate small portions 24 of the first composition onto surface 14 is effective in controlling the placement of the first composition, for example, while reducing, or even substantially eliminating the amount of the first composition dispensed onto the flange region 26 of female mold section 12.

Thus, in accordance with the present invention, when the first composition comprises a polymerizable lens composition, less of the polymerizable lens composition is wasted relative to dispensing the polymerizable lens composition onto the female mold section 12 as a single mass having a size of between 30 and microliters (between 30,000 and 50,000 nanoliters), as is conventionally done.

Reducing the amount of polymerizable lens composition wasted, for example, as a flash ring outside the lens shaped cavity 20 of the mold assembly 10, advantageously reduces the cost of producing the contact lens, and may provide other processing efficiencies, for example, since no additional processing is required to deal with the flash ring.

Alternatively, the first composition dispensed onto the female mold section 12 using a pneumatically operated valve can comprise a coating to provide a benefit, for example, to provide enhanced wettability to the lens body surface and/or antibiotic properties to the lens body surface and/or drug properties to the lens body surface and/or one or more other beneficial properties to the lens body surface and any and all combinations thereof.

In one example, the first composition is dispensed onto the female mold section 12 employing a pneumatically operated valve. Examples of such dispensing systems including a pneumatically operated valve include, without limitation, those described in Smith et al U.S. Pat. No. 5,747,102; Fiske et al U.S. Pat. No. 7,762,088; and Wang et al U.S. Patent Publication No. 2008/0267828, the disclosure of each of which is incorporated in its entirely herein by reference.

As previously discussed, useful dispensing systems include the P-DOT and P-JET systems sold by Liquidyn GmBH. The P-DOT system is known to be useful in non-contact micro-dispensing of high viscosity fluids; while the P-JET system is known to be useful in non-contact micro-dispensing of medium to low viscosity fluids. The dispensing system, for example, the P-JET system, may be adjusted to control the size of each portion of liquid composition dispensed, for example, in a range of about 50 nanoliters to about 1 milliliter or about 2 milliliters or more. Such adjustment may be made by varying the triggering time or switching time of the pneumatically operated valve included in the system.

In general, pneumatically operated valve dispensing systems are known to dispense liquid compositions, for example, of low, moderate and high viscosities, and include a pneumatically operated valve or a high-speed pneumatically operated valve. In one example, an air-operated valve element or needle is reciprocated for selectively engaging a valve seat surrounding a discharge passageway. In a process commonly referred to as jetting, portions or droplets of a liquid composition are dispensed by retracting the valve element or needle from contact with the valve seat (the retracted position being the open position of the valve), which allows a portion of the liquid composition to flow under pressure from a chamber filled with the liquid composition through a gap separating the valve element or needle from the valve seat and into a discharge passageway. The valve element or needle is then moved rapidly toward the valve seat to close the valve (the closed position of the valve), which causes the portion of liquid composition to be forced through the discharge passageway and a comparable portion of the liquid composition to be ejected from a discharge orifice of the discharge passageway. The small portion of ejected material is then propelled as a droplet toward a target surface.

In one example of the present invention, the portion or droplet of the liquid composition, for example, the polymerizable composition, is propelled toward the lens defining surface 14 of the female mold section 12 which is spaced apart from and not in contact with the discharge outlet defining the discharge orifice or any other part of the dispensing system. Thus, the dispensing may be referred to as non-contact dispensing. At least a portion of the dispensing system may be located near, for example, less than about 50 milli-meters, or in a range of about 2 to about 40 millimeters, away from the mold section, for example, to facilitate the desired placement and positioning of the small portions of composition on the mold section. In one example, each separate portion of the composition forms or extends over a region on the mold section, for example, a region having a maximum diameter or transverse dimension in a range of about 350 nanometers to about 2000 nanometers.

The plurality of separate portions of the composition dispensed are of more uniform volume relative to an equal number of separate portions of an identical composition dispensed using conventional lens mold filling techniques, for example, using a pump and an injection needle, without a pneumatically operated valve. In one example, each separate portion of the composition dispensed using a pneumatically operated valve has a volume which differs by less than about 10%, or by less than about 5%, or by less than about 3%, or by less than 1% from the average volume of the plurality of separate portions of the composition dispensed onto the mold section. In another example, the total volume of the composition dispensed as separate portions into a single mold section using one or more pneumatically operated valves has a volume which differs from a desired volume to be dispensed by less than about 25%, or less than about 20%, or less than about 15%, or less than about 10%, or less than about 5%, or less than about 3%, or less than about 1%. The enhanced uniformity in the volume of the separate portions of composition dispensed, and in the total volume dispensed, in accordance with the present invention provides benefits, such as better dispensing control and reduced waste of polymerizable lens composition caused by overfilling or underfilling the mold section with the composition, relative to previous lens mold filling techniques, such as, for example, those using syringe pumps. Each separate portion or droplet of the liquid composition is dispensed sequentially, for example, over a period of time of less than about 2 milliseconds, such as about millisecond or less. In one example, a high-speed pneumatically operated valve is used which has a switching time of about 2 milliseconds or less, or about 1 millisecond or less.

The dispensing system may be operatively coupled to a robotic assembly, for example, including a robotic arm, and moved by the robotic assembly using a preset program to dispense the desired amount of the polymerizable composition onto the concave surface 14 of the female mold section 12. Conversely, if desired, the female mold section 12 may be moved using a preset program, relative to the dispensing system, for example, a stationary dispensing system, to dispense the desired amount of the polymerizable composition onto the concave surface 14 of the female mold section.

Less than the total desired number of the separate, small portions of the liquid composition (e.g., a polymerizable composition, a non-polymerizable composition, a first liquid composition, a second liquid composition, etc.) can be dispensed into a mold section by a single dispensing valve. Put another way, a plurality of dispensing valves can be used to dispense one or more separate, small portions of a single liquid composition into a single mold section. For example, in order to dispense a desired volume of a liquid composition into a single mold section, a single mold section can pass under a plurality of dispensing valves, each of which dispense a given number of separate, small portions of the same liquid composition into the single mold section, wherein the number of separate, small portions of the liquid composition dispensed by each of the dispensing valves when combined add up to the total desired volume of the liquid composition to be dispensed into the mold section. Similarly or in addition, a plurality of dispensing valves can be used to each deliver all of the desired volume or a portion of the desired volume of different liquid compositions into a single mold section. In an automated manufacturing line, for example, one or more robotic gantries can be used to move a plurality of dispensing valves across a conveyor belt holding a plurality of mold sections in order to deliver multiple portions or multiple liquid compositions using a plurality of dispensing valves.

If separate, small portions of a polymerizable lens composition (e.g., a first liquid composition) are to be dispensed onto female mold section 12 in accordance with the present invention to provide all the polymerizable lens composition required to produce a contact lens, it may be necessary for the dispensing system to dispense additional separate small portions of the polymerizable lens composition over or on top of portions of the polymerizable lens composition already or previously dispensed onto the concave surface 14 of the female mold section 12. To illustrate this, in FIG. 3, a single array of separate small portions 24 of the polymerizable lens composition are shown on the concave surface 14 of the female mold section 12. Additional separate, small portions of the polymerizable lens composition may be needed to be dispensed onto the surface 14 so as to have sufficient polymerizable lens composition to produce a useful contact lens. Thus, a plurality of layers of separate, small portions of the polymerizable lens composition may be required to be dispensed in order to provide a sufficient or desired amount of the polymerizable lens composition on the concave surface 14 of the female mold section 12.

Once the sufficient or desired amount of the polymerizable lens composition has been dispensed as separate portions onto the female or first mold section 12, the male or second mold section 16 can be placed in contact with the female mold section, for example, on top of the female mold section, as shown in FIG. 1A.

The female mold section 12 may be connected to the male mold section 16. This connecting step may occur in any suitable manner, for example, provided that the connection between the two mold sections 12 and 16 remains secure while the cast mold polymeric lens body is formed from the material, for example, a polymerizable lens composition, in the lens shaped cavity 20. The connecting step may comprise engaging an interference fitting between the female mold section 12 and the male mold section 16, for example, sufficient to provide a desired secure coupling between the mold sections. In one example, the connecting step may comprise forming one weld or a plurality of welds between the female mold section 12 and the male mold section 16, for example, so as to fuse the two mold sections together, thereby providing the desired secure coupling between the mold sections. See, for example, U.S. Pat. No. 7,731,873, the disclosure of which is incorporated in its entirety herein by reference.

In one example, as shown in FIG. 1A, polymerizable lens composition 22 is located in the lens-shaped cavity 20, between lens defining or forming surfaces 14 and 18. The connected mold sections 12 and 16 and the polymerizable lens composition 22 in the lens shaped cavity 20 can then be subjected to conditions, for example, a level of thermal radiation and/or actinic radiation, effective to polymerize the polymerizable lens composition to form a cast molded polymeric lens body. See, for example, Rogers U.S. Pat. No. 7,785,092, the disclosure of which is incorporated in its entirety herein by reference.

After being subjected to such conditions, the male mold section 16 and the female mold section 12 may be separated, and the cast molded polymeric lens body may be removed from the male mold section 16 or the female mold section 12 and subjected to further processing, such as extraction, hydration and packaging, to produce a final contact lens ready for use by a lens wearer. Such further processing may be conducted using known procedures. For example, see U.S. Pat. No. 7,731,873, the disclosure of which is incorporated in its entirety herein by reference.

Figure 4:
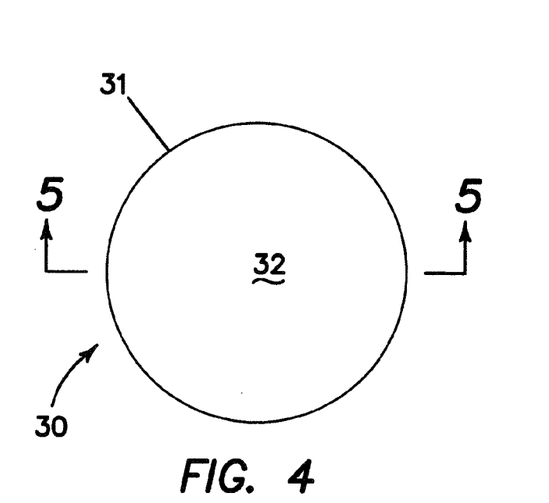
FIG. 4 is a top plan view of a contact lens in accordance with the present invention.
Figure 5:
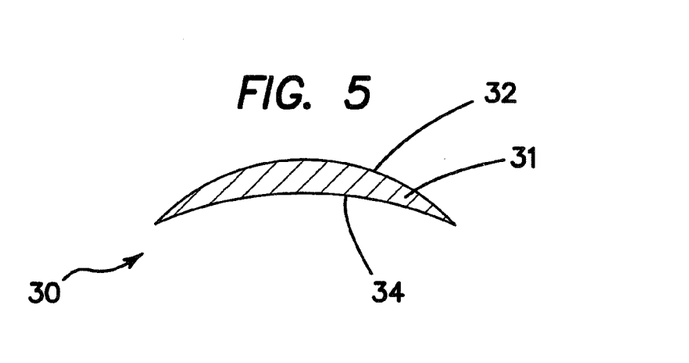
FIG. 5 is a cross sectional view of the contact lens shown in FIG. 4.

FIGS. 4 and 5 show such a final contact lens 30 comprising a cast molded polymeric lens body 31 having an anterior surface 32 and a posterior surface 34.

Figure 6:
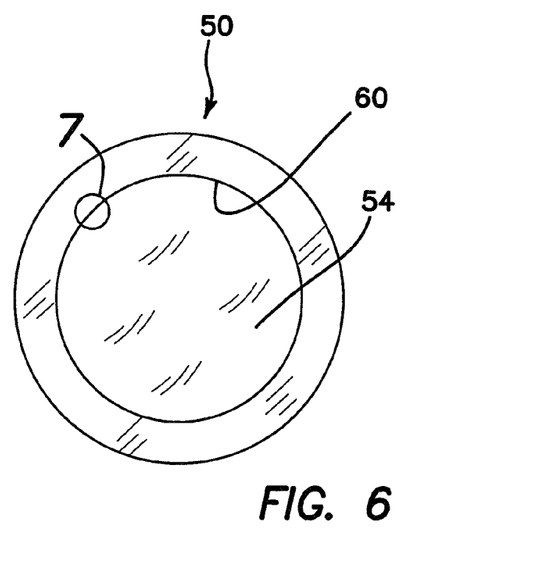
FIG. 6 is a plan view of a female mold section having a quantity of polymerizable lens composition disposed thereon.
Figure 7:
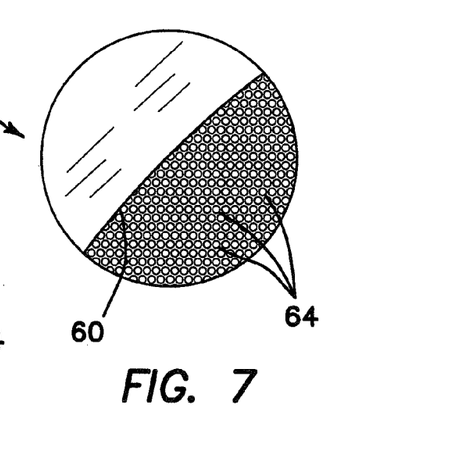
FIG. 7 is a close-up plan view of the encircled region 7 of the female mold section in FIG. 6 showing separate portions of a liquid composition disposed on the outer or upper surface of the polymerizable lens composition disposed on the female mold section.

FIGS. 6 and 7 illustrate another example of the present invention. In this example, a polymerizable lens composition 54 is dispensed onto the lens defining surface 60 of a female or first mold section 50, which, unless expressly otherwise described, is structured and functions similarly to female or first mold section 12.

The polymerizable lens composition 54 may be dispensed onto the lens defining surface 60 of the first mold section 50 in separate, small portions, as discussed herein, in accordance with the present invention. Alternately, the polymerizable lens composition 54 may be dispensed onto the surface 60 using conventional processing.

In any event, with regard to the cast molded polymeric lens body to be produced in the example illustrated in FIGS. 6 and 7, it is desired that the lens body include a surface treatment, for example and without limitation, a coating to provide a benefit, for example, to provide enhanced wettability to the lens body surface and/or antibiotic properties to the lens body surface and/or drug properties to the lens body surface and/or one or more other beneficial properties to the lens body surface and any and all combinations thereof.

To this end, after the polymerizable lens composition 54 has been dispensed onto the lens defining surface 60, another (second) liquid composition including one or more components, for example, and without limitation, one or more surfactants, one or more antibiotic components, one or more drug components, and the like and combinations thereof useful to provide the cast molded polymeric lens body to be formed with the desired surface property or properties, is dispensed onto the surface of the polymerizable lens composition already present on lens defining surface 60 in separate, small portions 64 in accordance with the present invention, for example, as shown in FIG. 7.

In one example, the separate, small portions 64 of the other liquid composition can be dispensed onto the polymerizable lens composition after the polymerizable lens composition has been partially or fully cured to form a polymeric lens body.

In another example, once the separate, small portions 64 of the other (second) liquid composition have been dispensed, a male or second mold section (not shown) can be connected to the female mold section 50 and the resulting mold assembly can be subjected to conditions, as noted elsewhere herein, effective to produce a cast molded polymeric lens body. The second mold section in this example is structured and functions similarly to male mold section 16. The first and second mold sections may be separated, and the cast molded polymeric lens body may be removed from the first or second mold section, and processed, for example, as noted above, to produce an acceptable and useful contact lens having the desired surface property or properties.

In the example described above, with reference to FIGS. 6 and 7, the posterior surface of the cast molded, polymeric lens body has a surface treatment providing the lens body with one or more desired surface properties.

If it is desired to provide the anterior surface of a cast molded polymeric lens body with one or more of such surface properties, then the separate, small portions 64 of the other liquid composition may be dispensed onto the lens defining surface 60 of first or female mold section 50 in accordance with the present invention before the polymerizable lens composition 54 is dispensed onto the lens defining surface 60. Except for this modification, the manufacturing process noted immediately above may be employed to produce a cast molded polymeric lens body having an anterior surface with one or more desired surface properties.

If it is desired to provide both the posterior surface and the anterior surface of the cast molded polymeric lens body with one or more of such surface properties, than separate, small portions 64 of the other (second) liquid composition may be dispensed onto the lens defining surface 60 of first or female mold section 50 in accordance with the present invention both before and after the polymerizable lens composition is dispensed onto the lens defining surface 60. If different surface properties are desired for the anterior and posterior surfaces of the cast molded polymeric lens body, then two different other liquid compositions may be used, i.e., a second liquid composition and a third liquid composition. Except for these modifications, the lens manufacturing process noted above may be employed to produce a cast molded polymeric lens body with both an anterior surface and a posterior surface having the same or different desired surface property or properties. The desired surface property or properties of the anterior surface and the posterior surface of the cast molded polymeric lens body may be the same or different relative to each other, for example, depending on the composition or chemical make-up of the separate, small portions 64 of second and/or third liquid compositions placed on the lens defining surface 60 before and after the polymerizable lens composition is placed on the surface 60.

Figure 7A:
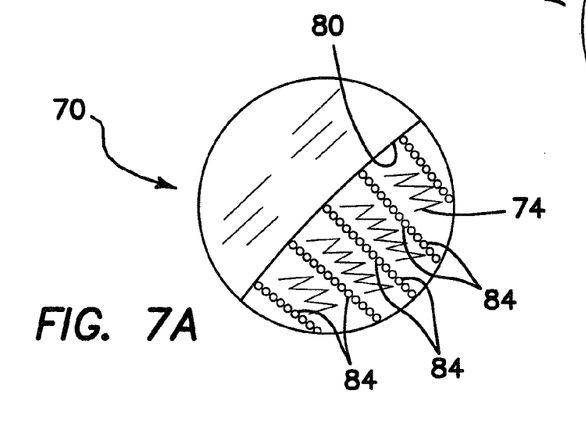
FIG. 7A is a close-up plan view of a region 7A, similar in size and position to region 7 in FIG. 6, showing separate portions of a liquid composition disposed in a cosmetic pattern on the outer or upper surface of the polymerizable lens composition disposed on the female mold section.

FIG. 7A illustrates a further example of the present invention. In this example, a polymerizable lens composition 74 is dispensed onto the lens defining surface 80 of the female or first mold section 70 which, unless expressly otherwise described, is structured and functions similarly to first mold section 12.

The polymerizable lens composition 74 may be dispensed onto the lens defining surface 80 of the first mold section 70 in separate, small increments, as discussed herein, in accordance with the present invention. In this example, the polymerizable lens composition 70 may be dispensed onto the surface 80 using conventional processing.

It is desired that the cast molded polymeric lens body to be produced in the example illustrated in FIG. 7A be cosmetically enhanced, in particular, to include a cosmetic pattern, for example an iris-simulating pattern.

This cosmetic pattern may be provided as follows. Before and/or after the polymerizable lens composition 74 is dispensed onto the lens defining surface 80, at least one other liquid composition having a color, for example, two or more compositions having different colors (i.e., at least a second liquid composition and optionally a third liquid composition, a fourth liquid composition, etc.), useful to provide the cast molded polymeric lens body with a cosmetic pattern, may be dispensed onto the lens defining surface 80 of the first or female mold section 70 in the form of separate, small portions 84 in accordance with the present invention, for example, as shown in FIG. 7A. The at least one other liquid composition may be dispensed in such a way as to provide a cosmetic pattern.

Once both the polymerizable lens composition 74 and the other composition(s), as separate portions 84, have been dispensed, a male or second mold section (structured similarly to male mold section 16) may be connected to the female mold section 70 and the resulting mold assembly may be subjected to conditions, as noted above, to produce a cast molded polymeric lens body including a cosmetic pattern. The first and second mold sections may be separated, and the cast molded polymeric lens body may be removed from the first or second mold section, and processed, for example, as noted above, to produce an acceptable and useful contact lens having a cosmetic pattern.

Cosmetic patterns including aesthetically pleasing iris-simulating patterns and patterns other than iris-simulating patterns, such as circles, other geometric shapes, stars, sparkles, and the like and combinations thereof may be provided to contact lenses in accordance with the present invention and are included within the scope of the present invention. In one example, either or both of the male and female lens mold sections comprises one or more polymeric materials. For example, each of the male and female lens mold sections may comprise an injection molded thermoplastic polymeric material. The thermoplastic polymeric material may comprise a polymer such as polyolefins, e.g., polypropylene, polyethylene, and the like, poly (ethylene vinyl alcohol) (EVOH), polyamides, polyoxymethylene, poly (ethylene terephthalate), cyclic olefin copolymers, polystyrene, polyvinyl chloride, copolymers of styrene with acrylonitrile and/or butadiene, acrylates, for example, poly methyl methacrylate, and the like, polyacrylonitrile, polycarbonate, polyesters, poly(4-methylpentene-1), and the like and mixtures thereof. In one particular example, the mold section may comprise EVOH.

The present disclosure includes the following aspects/embodiments/features in any order and/or in any combination:

1. The present disclosure relates to a method of manufacturing a contact lens, the method comprising:
    dispensing a plurality of separate portions of a liquid composition onto a contact lens mold section, each separate portion of the liquid composition having a volume of less than about 1000 nanoliters.
2. The method of any preceding or following embodiment/feature/aspect, wherein each separate portion of liquid composition is dispensed sequentially.
3. The method of any preceding or following embodiment/feature/aspect, wherein the dispensing comprises employing a pneumatically operated valve.
4. The method of any preceding or following embodiment/feature/aspect, wherein the dispensing comprises employing a pneumatically operated valve, and the pneumatically operated valve is a high-speed pneumatically operated valve.
5. The method of any preceding or following embodiment/feature/aspect, wherein the dispensing comprises employing a pneumatically operated valve, and the pneumatically operated valve is a component of a MICRO-DISPENSING VALVE P-DOT system or a MICRO-DISPENSING VALVE P-JET system.
6. The method of any preceding or following embodiment/feature/aspect, wherein each separate portion of the liquid composition is dispensed over a period of time of about 2 milliseconds or less.
7. The method of any preceding or following embodiment/feature/aspect, wherein each separate portion of the liquid composition is dispensed over a period of time of about 1 millisecond or less.
8. The method of any preceding or following embodiment/feature/aspect, wherein the dispensing comprises dispensing the liquid composition from a dispensing system not in contact with the contact lens mold section, provided that at least a portion of the dispensing system is located less than about 50 millimeters away from the contact lens mold section.
9. The method of any preceding or following embodiment/feature/aspect, wherein the dispensing comprises dispensing the liquid composition from a dispensing system not in contact with the contact lens mold section, provided that at least a portion of the dispensing system is located less than about 50 millimeters away from the contact lens mold section, and the at least a portion of the dispensing system is located at a distance in a range of about 2 millimeters to about 40 millimeters away from the contact lens mold section.

10. The method of any preceding or following embodiment/feature/aspect, wherein the liquid composition is dispensed onto a female contact lens mold section.

11. The method of any preceding or following embodiment/feature/aspect, wherein the liquid composition comprises a polymerizable composition.

12. The method of any preceding or following embodiment/feature/aspect, wherein the liquid composition comprises a polymerizable composition, and the polymerizable composition comprises at least one hydrophilic monomer to be polymerized in forming a hydrogel contact lens.

13. The method of any preceding or following embodiment/feature/aspect, wherein the liquid composition comprises a polymerizable composition, and the polymerizable composition comprises at least one siloxane monomer to be polymerized in forming a silicone hydrogel contact lens.

14. The method of any preceding or following embodiment/feature/aspect, wherein the liquid composition comprises a polymerizable composition, and further comprising a step of exposing the contact lens mold section to a level of thermal radiation, actinic radiation, or both, effective to polymerize the polymerizable composition to form a polymeric lens body in the contact lens mold section.

15. The method of any preceding or following embodiment/feature/aspect, wherein the liquid composition is a non-polymerizable composition.

16. The method of any preceding or following embodiment/feature/aspect, wherein the liquid composition is a non-polymerizable composition, and the non-polymerizable composition comprises at least one surfactant.

17. The method of any preceding or following embodiment/feature/aspect, wherein the dispensing is effective to coat at least a portion of a surface of the contact lens mold section with the liquid composition.

18. The method of any preceding or following embodiment/feature/aspect, wherein the dispensing is effective to substantially fill the contact lens mold section with the liquid composition.

19. The method of any preceding or following embodiment/feature/aspect, wherein the dispensing is effective to place the liquid composition on top of another composition other than the contact lens mold section.

20. The method of any preceding or following embodiment/feature/aspect, wherein the dispensing is effective to place the liquid composition on top of another composition other than the contact lens mold section, and the other composition is a polymerized composition.

21. The method of any preceding or following embodiment/feature/aspect, wherein the dispensed liquid composition is effective to provide at least one of (1) a benefit to the contact lens mold section into which the liquid composition is dispensed and (2) a benefit to the contact lens produced using the contact lens mold section into which the liquid composition is dispensed.

22. The method of any preceding or following embodiment/feature/aspect, wherein each separate portion of the liquid composition has a volume which differs by less than about 5% from the average volume of the plurality of separate portions of the liquid composition.

23. The method of any preceding or following embodiment/feature/aspect, wherein each separate portion of the liquid composition has a volume which differs by less than about 3% from the average volume of the plurality of separate portions of the liquid composition.

24. The method of any preceding or following embodiment/feature/aspect, wherein each separate portion of the liquid composition has a volume which differs by less than about 1% from the average volume of the plurality of separate portions of the liquid composition.

25. The method of any preceding or following embodiment/feature/aspect, wherein the liquid composition has a viscosity of at least about 0.5 mPas at about 25° C.

26. The method of any preceding or following embodiment/feature/aspect, wherein the plurality of separate portions of the liquid composition dispensed are of more uniform volume relative to an equal number of separate portions of an identical liquid composition dispensed using a syringe pump and an injection needle without a pneumatically operated valve.

27. The method of any preceding or following embodiment/feature/aspect, wherein the contact lens mold section comprises a first contact lens mold section, and the method further comprises a step of placing a second contact lens mold section in contact with the first contact lens mold section.

28. The method of any preceding or following embodiment/feature/aspect, wherein the contact lens mold section comprises a first contact lens mold section, and the method further comprises a step of placing a second contact lens mold section in contact with the first contact lens mold section, and further comprising a step of connecting the first contact lens mold section to the second contact lens mold section.

29. The method of any preceding or following embodiment/feature/aspect, wherein the contact lens mold section comprises a first contact lens mold section, the method further comprises a step of placing a second contact lens mold section in contact with the first contact lens mold section, and further comprising a step of connecting the first contact lens mold section to the second contact lens mold section, and wherein the connecting comprises engaging an interference fitting between the first contact lens mold section and the second contact lens mold section, or forming at least one weld between the first contact lens mold section and the second contact lens mold section.

30. The method of any preceding or following embodiment/feature/aspect, wherein the method forms a polymeric lens body substantially without forming a flash ring.

31. The present disclosure also relates to an apparatus useful in producing a contact lens, the apparatus comprising:
    a contact lens mold section; and
    a liquid composition located on the contact lens mold section, the liquid composition dispensed onto the contact lens mold section as a plurality of separate portions of the liquid composition, each separate portion of the liquid composition having a volume of less than about 1000 nanoliters.

32. The apparatus of any preceding or following embodiment/feature/aspect, which further comprises a pneumatically operated valve used in dispensing the liquid composition onto the contact lens mold section.

33. The apparatus of any preceding or following embodiment/feature/aspect, which further comprises a pneumatically operated valve used in dispensing the liquid composition onto the contact lens mold section, and wherein the pneumatically operated valve is a high-speed pneumatically operated valve.

34. The apparatus of any preceding or following embodiment/feature/aspect, wherein the contact lens mold section is a female contact lens mold section.

35. The apparatus of any preceding or following embodiment/feature/aspect, wherein the liquid composition comprises a polymerizable composition.

36. The apparatus of any preceding or following embodiment/feature/aspect, wherein the liquid composition comprises a polymerizable composition, and the polymerizable composition comprises at least one siloxane monomer to be polymerized in forming a contact lens.

37. The apparatus of any preceding or following embodiment/feature/aspect, wherein the liquid composition comprises a polymerizable composition, and the polymerizable composition comprises at least one hydrophilic monomer to be polymerized in forming a contact lens.

38. The apparatus of any one of any preceding or following embodiment/feature/aspect, wherein the liquid composition is a non-polymerizable composition.

39. The apparatus of any preceding or following embodiment/feature/aspect, wherein the plurality of separate portions of the liquid composition coat at least a portion of a surface of the contact lens mold section with the liquid composition.

40. The apparatus of any preceding or following embodiment/feature/aspect, wherein the plurality of separate portions of the liquid composition substantially fill the contact lens mold section with the liquid composition.

41. The apparatus of any preceding or following embodiment/feature/aspect, wherein the plurality of separate portions of the liquid composition are located on top of another composition other than the contact lens mold section.

42. The apparatus of any preceding or following embodiment/feature/aspect, wherein the plurality of separate portions of the liquid composition are located on top of another composition other than the contact lens mold section, and the other composition comprises a polymerizable composition.

43. The apparatus of any preceding or following embodiment/feature/aspect, wherein the plurality of separate portions of the liquid composition are located on top of another composition other than the contact lens mold section, and the other composition comprises a polymerized composition.

44. The apparatus of any preceding or following embodiment/feature/aspect, wherein the liquid composition provides at least one of (1) a benefit to the contact lens mold section in which the liquid composition is located and (2) a benefit to a contact lens produced using the contact lens mold section in which the liquid composition is located.

45. The apparatus of any preceding or following embodiment/feature/aspect, wherein each separate portion of the liquid composition has a volume which differs by less than about 5% from the average volume of the plurality of separate portions of liquid composition.

46. The apparatus of any preceding or following embodiment/feature/aspect, wherein each separate portion of the liquid composition has a volume which differs by less than about 3% from the average volume of the plurality of separate portions of fluid material.

47. The apparatus of any preceding or following embodiment/feature/aspect, wherein each separate portion of the liquid composition has a volume which differs by less than about 1% from the average volume of the plurality of separate portions of fluid material.

48. The present disclosure also relates to a contact lens comprising:
a cast molded polymeric lens body formed from a liquid composition in a mold assembly comprising a first contact lens mold section coupled to a second contact lens mold section, wherein at least a portion of the composition is dispensed onto the first contact lens mold section or the second contact lens mold section as a plurality of separate portions of a liquid composition, each separate portion of the liquid composition having a volume of less than about 1000 nanoliters.

49. The contact lens of any preceding or following embodiment/feature/aspect, wherein the liquid composition comprises a polymerizable composition comprising at least one monomer to be polymerized in forming the polymeric lens body.

50. The contact lens of any preceding or following embodiment/feature/aspect, wherein the liquid composition comprises a polymerizable composition, and the polymerizable composition comprises at least one siloxane monomer.

51. The contact lens of any preceding or following embodiment/feature/aspect, wherein the liquid composition is a non-polymerizable composition.

52. The contact lens of any preceding or following embodiment/feature/aspect, wherein the liquid composition is effective to provide at least one of (1) a benefit to the mold assembly and (2) a benefit to the cast molded polymeric lens body.

53. The contact lens of any preceding or following embodiment/feature/aspect, wherein the cast molded polymeric lens body is formed substantially without forming a flash ring.

54. The contact lens of any preceding or following embodiment/feature/aspect, wherein the cast molded polymeric lens body includes a cosmetic pattern derived from the liquid composition.

55. The contact lens of any preceding or following embodiment/feature/aspect, wherein the cast molded polymeric lens body includes a surface treatment located on a surface of the cast molded polymeric lens body, the surface treatment being derived from the liquid composition.

56. The contact lens of any preceding or following embodiment/feature/aspect, wherein the cast molded polymeric lens body includes a surface treatment located on a surface of the cast molded polymeric lens body, the surface treatment being derived from the liquid composition, and the surface treatment is effective to provide a benefit to the surface of the cast molded polymeric lens body.

57. The contact lens of any preceding or following embodiment/feature/aspect, wherein the cast molded polymeric lens body includes a surface treatment located on a surface of the cast molded polymeric lens body, the surface treatment being derived from the liquid composition, the surface treatment is effective to provide a benefit to the surface of the cast molded polymeric lens body, and the benefit is selected from the group consisting of providing one or more drug components to the surface, providing one or more anti-microbial components to the surface, providing one or more wettability agents to the surface and combinations thereof.

58. The contact lens of any preceding or following embodiment/feature/aspect, wherein the cast molded polymeric lens body includes a surface treatment located on a surface of the cast molded polymeric lens body, the surface treatment being derived from the liquid composition, the surface treatment is effective to provide a benefit to the surface of the cast molded polymeric lens body, the benefit consists of providing one or more drug components to the surface, and the one or more drug components provided to the surface comprises an anti-allergy drug, an anti-inflammatory drug, or both.

59. The present disclosure also relates to a method of manufacturing a contact lens, the method comprising:
dispensing at least one portion of a polymerizable composition onto a contact lens mold section, the dispensing comprises employing a dispensing system comprising a high-speed pneumatically operated valve having a switching time of about 2 milliseconds or less.

60. The method of any preceding or following embodiment/feature/aspect, wherein the high-speed pneumatically operated valve has a switching time of about 1 millisecond or less.

61. The method of any preceding or following embodiment/feature/aspect, wherein the dispensing provides a plurality of portions of the polymerizable composition onto the contact lens mold section, and each portion has a volume which differs by about 3% or less from the average volume of the plurality of portions.

62. The method of any preceding or following embodiment/feature/aspect, wherein the dispensing provides a plurality of portions of the polymerizable composition onto the contact lens mold section, and each portion has a volume which differs by about 1% or less from the average volume of the plurality of portions.

63. The method of any preceding or following embodiment/feature/aspect, wherein the volume of the at least one portion or the volume of each portion of the plurality of portions is in a range of about 10 nanoliters to about 2 milliliters.

64. The method of any preceding or following embodiment/feature/aspect, wherein the volume of the at least one portion or the volume of each portion of the plurality of portions is in a range of about 10 nanoliters to about 200 nanoliters.

65. The method of any preceding or following embodiment/feature/aspect, wherein the viscosity of the polymerizable composition is in a range of about 0.5 mPas to about 200,000 mPas 66. The method of any preceding or following embodiment/feature/aspect, wherein the viscosity of the polymerizable composition is in a range of about 50 mPas to about 10,000 mPas 67. The method of any preceding or following embodiment/feature/aspect, wherein during the dispensing at least a portion of the dispensing system is located at a distance in a range of about 2 millimeters to about 40 millimeters away from the contact lens mold section.

68. The method of any preceding or following embodiment/feature/aspect, wherein the dispensing occurs so that no portion of the dispensing system is in contact with the contact lens mold section or the polymerizable composition on the contact lens mold section.

69. The method of any preceding or following embodiment/feature/aspect, wherein the method further comprises the step of verifying that the at least one portion or each portion of the plurality of portions is dispensed.

70. The method of any preceding or following embodiment/feature/aspect, wherein the method further comprises the step of verifying that the at least one portion or each portion of the plurality of portions is dispensed, and the step of verifying comprises using a closed loop sensor assembly.

71. The method of any preceding or following embodiment/feature/aspect, which further comprises maintaining the high-speed pneumatically operated valve at a temperature so that the polymerizable composition being dispensed has a substantially constant viscosity.

72. The method of any preceding or following embodiment/feature/aspect, which further comprises heating the high-speed pneumatically operated valve to a temperature above ambient temperature.

While the present invention has been described with respect to various specific examples and examples, it is to be understood that the invention is not limited thereto and that it can be variously practiced within the scope of the following claims.

What is claimed is:

1. A method useful in manufacturing a contact lens, the method comprising:
   dispensing a sufficient amount of a liquid composition onto a contact lens mold section having a lens defining surface and a flange region to provide a coating of the liquid composition on at least a substantial portion of the lens defining surface of the contact lens mold section;
   wherein the dispensing employs a pneumatically operated valve to dispense the sufficient amount of the liquid composition as a plurality of separate portions of the liquid composition onto the lens defining surface of the contact lens mold section while reducing the amount of the liquid composition dispensed onto the flange region of the contact lens mold section, and each of the separate portions of the liquid composition has a volume which is less than about 1000 nanoliters and which differs by less than 5% from an average volume of the plurality of separate portions of the liquid composition.

2. The method of claim 1, wherein each separate portion of the liquid composition is dispensed sequentially and the dispensing substantially eliminates the amount of the liquid composition dispensed onto the flange region of the contact lens mold section.

3. The method of claim 1, wherein the liquid composition comprises a siloxane-containing monomer.

4. The method of claim 1, wherein each separate portion of the liquid composition is dispensed over a period of time of about 2 milliseconds or less and the dispensing is effective to provide a coating of the liquid composition on substantially the entire lens defining surface of the contact lens mold section.

5. The method of claim 1, wherein the liquid composition comprises a polymerizable composition, and the polymerizable composition comprises at least one hydrophilic monomer to be polymerized in forming a hydrogel contact lens.

6. The method of claim 1, wherein the liquid composition comprises a non-polymerizable composition, and the non-polymerizable composition comprises at least one surfactant.

7. The method of claim 1, wherein the liquid composition comprises a liquid composition having a color, and the plurality of separate portions of the liquid composition having a color are dispensed into the contact lens mold section in such a way as to provide a cosmetic pattern derived from the liquid composition to the contact lens.

8. The method of claim 1, wherein the liquid composition comprises a surface treatment liquid composition, and the plurality of separate portions of the surface treatment liquid composition provide a surface treatment derived from the liquid composition on a surface of the contact lens.

9. The method of claim 1, wherein each separate portion of the liquid composition has a volume which differs by less than 3% from the average volume of the plurality of separate portions of the liquid composition.

10. The method of claim 1, wherein the plurality of separate portions of the liquid composition dispensed are of more uniform volume relative to an equal number of separate portions of an identical liquid composition dispensed using a syringe pump and an injection needle without a pneumatically operated valve.

11. The method of claim 1, wherein the method forms a polymeric lens body substantially without forming a flash ring.

12. The method of claim 1, wherein the liquid composition comprises a polymerizable composition, and the dispensing comprises employing a dispensing system comprising a high-speed pneumatically operated valve having a switching time of about 2 milliseconds or less.

13. An apparatus useful in producing a contact lens, the apparatus comprising:
   a dispensing system comprising a pneumatically operated valve;
   a contact lens mold section having a lens defining surface and a flange region; and
   a sufficient amount of liquid composition to be dispensed onto the contact lens mold section by the dispensing system to provide a coating on at least a substantial portion of the lens defining surface of the contact lens mold section, wherein the pneumatically operated valve is configured to be used in dispensing the sufficient amount of liquid composition onto the contact lens mold section as a plurality of separate portions of the liquid composition while reducing the amount of the liquid composition dispensed onto the flange region of the contact lens mold section, each separate portion of the liquid composition having a volume of less than about 1000 nanoliters, wherein the volume of each separate portion of the liquid composition differs by less than 5% from an average volume of the plurality of separate portions of the liquid composition.

14. The apparatus of claim 13, wherein the dispensing system comprises a high-speed pneumatically operated valve having a switching time of 2 milliseconds or less and the dispensing substantially eliminates the amount of the liquid composition dispensed onto the flange region of the contact lens mold section.

15. The apparatus of claim 13, wherein the liquid composition comprises at least one of a polymerizable composition and a non-polymerizable composition.

16. The apparatus of claim 13, wherein the sufficient amount of liquid composition to be dispensed provides a coating of the liquid composition on substantially the entire lens defining surface of the contact lens mold section.

17. A contact lens comprising:
   a cast molded polymeric lens body formed in a mold assembly comprising a first contact lens mold section having a lens defining surface and a flange region coupled to a second contact lens mold section, wherein a sufficient amount of liquid composition is dispensed onto the first contact lens mold section to provide a coating of the liquid composition on at least a substantial portion of the lens defining surface of the first mold section, the sufficient amount of liquid composition being dispensed as a plurality of separate portions of the liquid composition while reducing the amount of the liquid composition dispensed onto the flange region of the first contact lens mold section, each separate portion of the liquid composition having a volume of less than about 1000 nanoliters and being dispensed by a dispensing system comprising a pneumatically operated valve, and the volume of each separate portion of the liquid composition differing by less than 5% from an average volume of the plurality of separate portions of the liquid composition.

18. The contact lens of claim 17, wherein the cast molded polymeric lens body includes a cosmetic pattern derived from the sufficient amount of liquid composition.

19. The contact lens of claim 17, wherein the cast molded polymeric lens body includes a surface treatment located on a surface of the cast molded polymeric lens body, the surface treatment being derived from the sufficient amount of liquid composition and the dispensing substantially eliminates the amount of the liquid composition dispensed onto the flange region of the first contact lens mold region.

20. The contact lens of claim 17, wherein the sufficient amount of liquid composition is dispensed onto the first contact lens mold section to provide a coating on substantially the entire lens defining surface of the first contact lens mold section.

* * * * *